P. H. MISTRAL & A. R. BROCHE.
AUTOMATICALLY ADJUSTABLE HYDRAULIC PUMP.
APPLICATION FILED MAR. 11, 1913.
1,119,029.
Patented Dec. 1, 1914.
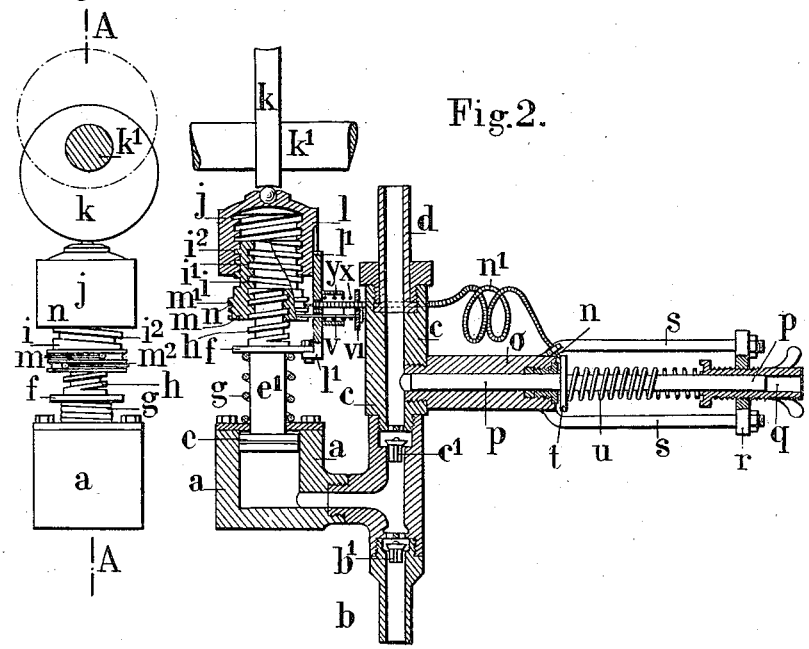

UNITED STATES PATENT OFFICE.

PAUL HENRI MISTRAL AND ALFRED RAOUL BROCHE, OF NEUILLY-SUR-SEINE, FRANCE.

AUTOMATICALLY-ADJUSTABLE HYDRAULIC PUMP.

1,119,029.   Specification of Letters Patent.   Patented Dec. 1, 1914.

Application filed March 11, 1913. Serial No. 753,527.

*To all whom it may concern:*

Be it known that we, PAUL HENRI MISTRAL and ALFRED RAOUL BROCHE, both of 73 Boulevard Victor Hugo, Neuilly-sur-Seine, Seine, Republic of France, mechanics, have invented an Automatically-Adjustable Hydraulic Pump, of which the following is a full, clear, and exact description.

The invention has for its object a hydraulic pump characterized by the fact that its outflow is automatically adjusted by a special device employing the pressure of delivery for automatically increasing or diminishing the length of the piston stroke and, consequently, the outflow of the pump.

The invention is illustrated by way of example in the accompanying drawing, in which:

Figure 1 is a side view of the pump, the piston being at the bottom of its stroke; Fig. 2 is a vertical section made according to line A—A of Fig. 1, the piston being at the top of its stroke.

As illustrated in the drawing, the pump forming the subject-matter of the present invention comprises a pump barrel $a$ with which communicates a suction pipe $b$ leading to the feed tank and a delivery pipe or chamber $c$ connected by a pipe $d$ to a tank or receiving apparatus. Check valves $b'$ and $c'$, suitably arranged, allow the suction and the delivery of the liquid.

In the pump barrel $a$ can move a piston $e$ on the rod $e'$ of which is secured a plate $f$ serving as a bearing for a coil spring $g$ arranged between said plate and the pump barrel.

The part of the piston rod $e'$ placed above the plate $f$ is provided with a screw thread $h$ adapted to engage in a nut $i$ of special arrangement. This nut is internally provided with a female screw thread $i'$ receiving the screw thread of the piston rod $e'$ and is provided exteriorly with a screw thread $i^2$ of contrary direction relatively to the screw thread $i'$. This screw thread allows of the nut $i$ being mounted in a cap $j$ upon which can act a cam $k$ keyed on a shaft $k'$. This cap $j$ is provided with a vertical groove $l$ in which is fitted a member $l'$ integral with the plate $f$ and adapted to prevent said cap from rotating when the nut is rotated, as will be seen hereafter.

The nut $i$ constitutes at its base a pulley $m$ with two grooves $m'$ and $m^2$, the former receiving a cable $n$ engaged in a flexible tube $n'$ and adapted to connect the pulley and, consequently, the nut $i$ to an automatic outflow regulator. Said regulator comprises a hollow cylinder $o$ arranged at right angles to the tube $c$ and communicating with the latter. In the cylinder $o$ can move a smooth piston $p$, having a greater length than said cylinder, the free end of which can slide in a nut $q$ engaged in a plate $r$ provided with a screw threaded opening. Said plate $r$ is held by two arms $s$ integral with the cylinder $o$ (Fig. 2).

On the piston $p$ is secured a disk $t$ serving as a bearing for one of the ends of a coil spring $u$ arranged between said disk and the nut $q$. The disk $t$ receives also one of the ends of the cable $n$, the other end of the cable being secured in the groove $m'$ of the pulley $m$. The groove $m^2$ of said pulley receives a cable $v$ secured on a small plate $v'$ serving as a bearing for a coil spring $x$ partly engaged in a small cylinder $y$ integral with the member $l'$.

The operation of the pump is as follows: The regulator being adjusted by means of the nut $q$ which compresses the spring $u$ for obtaining the desired tension, the actuating cam $k$ is set in motion. The piston $e$ will be driven within the barrel $a$ under the action of said cam and will drive back the liquid into the chamber $c$. As the cam moves upward, the spring $g$, which had been compressed, expands and raises the piston $e$, thus producing the suction of the liquid in the pump barrel $a$ and so on. When the pressure in the delivery chamber $c$, exceeds the pressure balanced by the tension of the spring $u$ of the regulator, the piston $p$ will be pushed back toward the exterior and will move the disk $t$ with it. As the latter is connected by the cable $n$ to the pulley $m$ constituting the base of the nut $i$, said cable by stretching out will impart to said nut a rotary motion which will have for effect to screw this nut into the cap $j$ and to move the latter toward the rod $e'$ of the piston, the length of the stroke of which will thus be diminished. In consequence, the outflow of the pump diminishes automatically and proportionally to the reduction of the stroke of the piston and the work, in consequence of this reduction of outflow, diminishes also, so that the force absorbed by the operation of the pump will be constant.

If the pressure in the delivery diminishes, the piston $p$ is pushed back by the spring $u$ of the regulator, the cable $n$ slackens and the spring $x$, which had been compressed by the rotary motion of the nut $i$, acts, through the medium of the cable $v$, upon this nut and causes it to rotate in the reverse direction, this having for effect to cause the cap $j$ to move upwardly and to increase the stroke of the piston and, consequently, the outflow of the pump.

It is to be understood that the movement of the regulating piston $p$ can be transmitted to the nut $i$ in any suitable manner.

The above arrangements are given only by way of example, the forms, sizes and detail devices may be varied according to circumstances without modifying the principle of the invention.

Claims:

1. A hydraulic pump comprising a pump barrel, a suction pipe and a delivery pipe connected to said pump barrel, check valves arranged in said pipes, a piston moving in the pump barrel, a plate secured on the piston rod, a spring arranged between said plate and the pump barrel, a screw thread on the piston rod, a nut fitted on this screw thread, a screw thread of contrary direction formed on the outer wall of the nut, a cap fitted on said screw thread, a cam acting upon said cap, a member for preventing the cap from rotating, and devices for causing the nut to rotate when the pressure in the delivery pipe exceeds a given value.

2. A hydraulic pump comprising a pump barrel, a suction pipe and a delivery pipe connected to said pump barrel, check valves arranged in said pipes, a piston moving in the pump barrel, a plate secured on the piston rod, a spring arranged between said plate and the pump barrel, a screw thread on the piston rod, a nut fitted on this screw thread, a screw thread of contrary direction formed on the outer wall of the nut, a cap fitted on said screw thread, a cam acting upon said cap, a member for preventing the cap from rotating, a pulley with two grooves placed at the base of the nut, a flexible cable engaged in one of the grooves of the pulley, and devices for exerting a traction on this cable when the pressure in the delivery pipe exceeds a given value.

3. A hydraulic pump comprising a pump barrel, a piston moving in the latter, a suction pipe and a delivery pipe connected to the pump barrel, a hollow cylinder secured on the delivery pipe, a piston moving in said cylinder, a disk secured on said piston, a flexible cable secured on said disk, a nut connected by said cable to said disk and receiving the pump piston rod and a cap upon which acts a cam for actuating said pump piston.

4. A hydraulic pump comprising a pump barrel, a piston moving in the latter, a suction pipe and a delivery pipe connected to the pump barrel, a hollow cylinder secured on the delivery pipe, a piston moving in said cylinder, a disk secured on said piston, a nut through which passes said piston, a screw threaded plate holding the nut, two arms supporting said plate, a tension spring arranged between the nut and the disk, a flexible cable secured on said disk, a nut connected by said cable to said disk and receiving the pump piston rod, and a cap upon which acts a cam for actuating said pump piston.

5. A hydraulic pump comprising a pump barrel, a piston moving in the latter, a suction pipe and a delivery pipe connected to the pump barrel, a hollow cylinder secured on the delivery pipe, a piston moving in said cylinder, a disk secured on said piston, a nut through which passes said piston, a screw threaded plate holding the nut, two arms supporting said plate, a tension spring arranged between the nut and the disk, a flexible cable secured on said disk, a nut connected by said cable to said disk and receiving the pump piston rod, and a cap upon which acts a cam for actuating said pump piston.

The foregoing specification of our automatically adjustable hydraulic pump signed by us this 18th day of February 1913.

PAUL HENRI MISTRAL.
    ALFRED RAOUL BROCHE.

Witnesses:
    HANSON C. COXE,
    RENÉ THIRIOT.